Feb. 4, 1936.  F. T. LEAHY, JR  2,029,779
AUTOMATIC TUNING CONTROL FOR RADIO COMMUNICATION APPARATUS
Filed Jan. 11, 1934  2 Sheets-Sheet 1
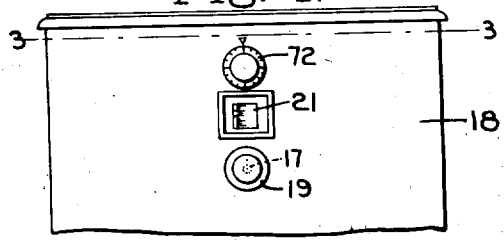
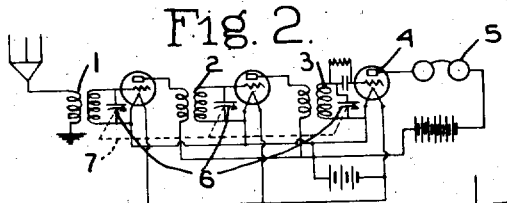
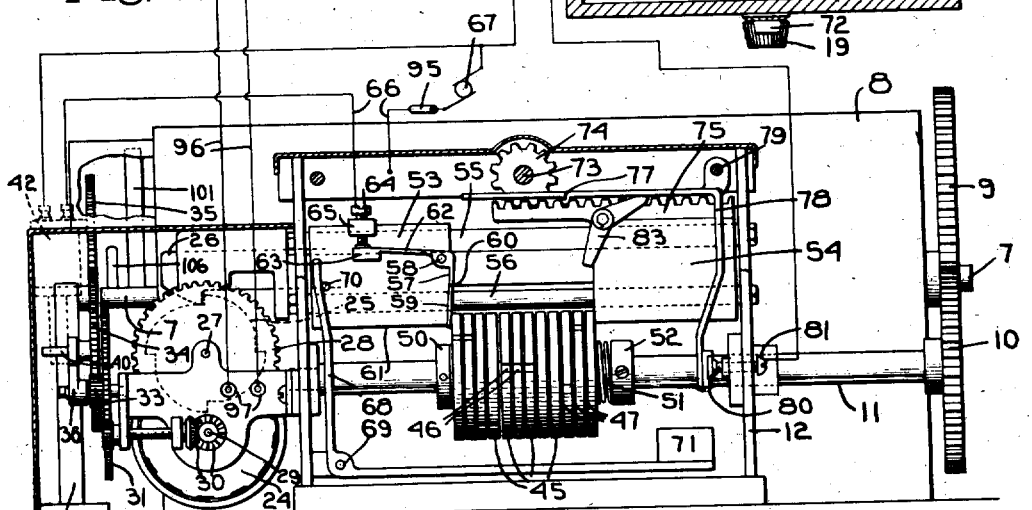
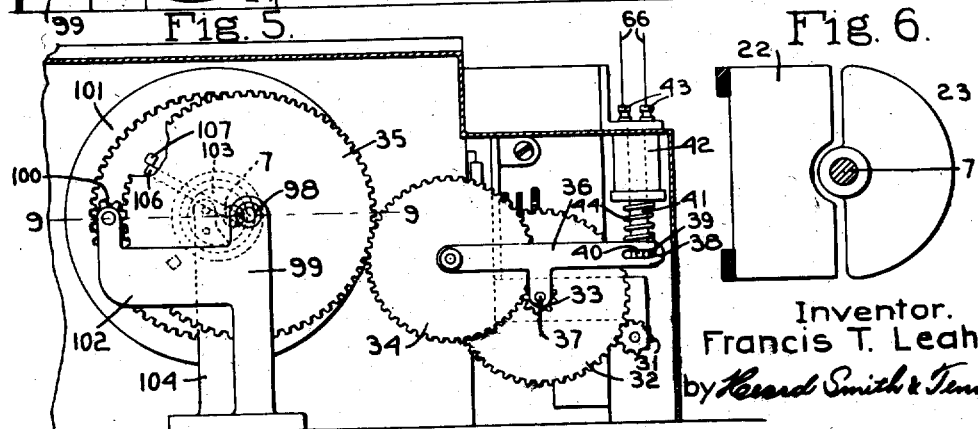
Inventor.
Francis T. Leahy Jr.
by Heard Smith & Tennant
Att.

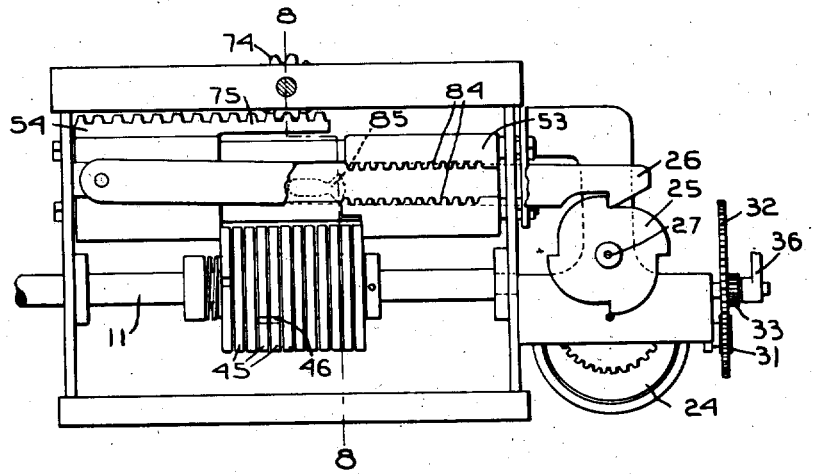
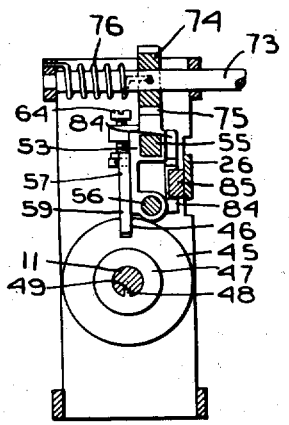
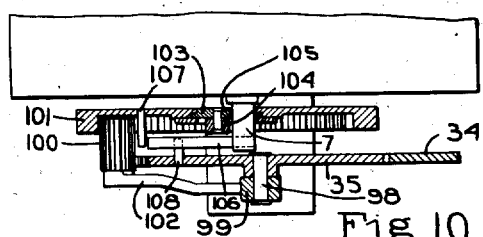
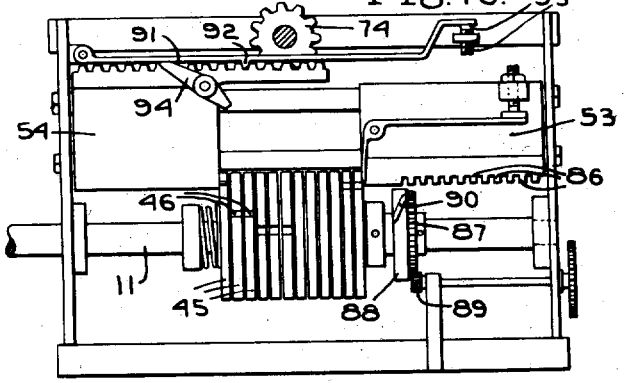
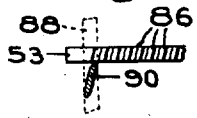
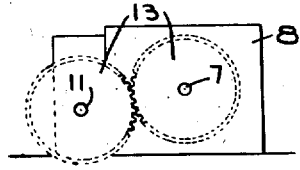
Inventor.
Francis T. Leahy Jr.
by Heard Smith & Tennant.
Attys Patented Feb. 4, 1936

2,029,779

UNITED STATES PATENT OFFICE 2,029,779

AUTOMATIC TUNING CONTROL FOR RADIO COMMUNICATION APPARATUS

Francis T. Leahy, Jr., Brookline, Mass.

Application January 11, 1934, Serial No. 706,210

3 Claims. (Cl. 250—20)

This invention relates to radio communication apparatus, and particularly to means for automatically controlling the variable capacitance associated therewith.

The principal object of the invention is to provide means for automatically causing the apparatus to resonate at a predetermined succession of wave-lengths according to a predetermined time sequence.

A further object of the invention is to provide such an apparatus in which the program selected may be widely diversified.

A further object of the invention is to provide a means for readily and accurately readjusting the apparatus to secure response thereof to the selected program.

A further object of the invention is to provide a single controlled source of power for actuating the apparatus to determine the time intervals between features on the program and also mechanically to move the adjustable elements into resonating position.

A further object of the invention is to provide a mechanism for alternately driving the shaft of the variable capacitance associated with the apparatus first in one direction and then in the opposite direction.

A further object of the invention is to provide means for automatically de-energizing the apparatus at the end of a program and also to restore the elements thereof to their initial position, from which point they may be again adjusted to receive another program.

Other objects and features will more fully appear from the following specification in connection with the accompanying drawings and will be particularly pointed out in the claims.

In its basic form, the invention consists of a capacitance or condenser desirably continuously variable by the rotation of movable elements with relation to fixed elements insulated therefrom. A driving mechanism acts intermittently to vary the capacity of the condenser according to the preadjusted position of a plurality of index members mounted on a shaft, which hereinafter will be termed a selector shaft. The selector shaft has a positive mechanical interconnection with the condenser shaft and rotates therewith at a fixed relative speed.

The index members are frictionally driven by the selector shaft, and each has a point thereon which co-operates with the driving mechanism to move the condenser into resonating position at a preselected wave-length. Each index member is manually preadjusted to its proper indexing position upon the selector shaft in a manner which more properly will be described in detail hereinafter.

The driving mechanism is under the control of a clock mechanism which successively causes each index member to establish and maintain the adjustment of the condenser to the wave-length selected to be governed by each index member throughout a predetermined time period.

In the drawings:

Fig. 1 is a front elevation of the apparatus enclosed in a cabinet.

Fig. 2 is a diagrammatic illustration of the electrical connections embodied in a preferred form of the invention.

Fig. 3 is a section on the line 3—3, Fig. 1, illustrating the arrangement of the elements of the apparatus within the cabinet.

Fig. 4 is a side elevation of the automatic controlling mechanism.

Fig. 5 is an end view in elevation of the driving means employed to actuate the variable condenser incorporated in the apparatus.

Fig. 6 is a transverse cross-sectional view through the variable condenser.

Fig. 7 is a side view of a portion of the controlling mechanism viewed from the opposite side from that illustrated in Fig. 4.

Fig. 8 is a transverse cross-sectional view on the line 8—8, Fig. 7.

Fig. 9 is a cross-sectional view on the line 9—9, Fig. 5.

Fig. 10 is a side elevation illustrating a modified form of the driving mechanism.

Fig. 11 is a detail view illustrating a portion of the mechanism shown in Fig. 10.

Fig. 12 is a detail view illustrating a positive mechanical drive between the automatic actuating mechanism and the condenser having a 1 to 1 ratio.

To present the invention more clearly and accurately, preferred embodiments thereof are illustrated and will be described.

The invention is adaptable to radio transmitting apparatus as well as radio receiving apparatus. The apparatus will herein be described in connection with radio receiving apparatus.

The design of the various electrical circuits constituting the receiving apparatus proper forms no part of the invention. The receiving circuits may, therefore, follow any suitable radio receiving hookup. As shown herein, the receiving apparatus proper consists of a plurality of radio frequency circuits 1, 2 and 3, shown diagrammatically in Fig. 2. These circuits are arranged as usual in cascade. The output of the last stage is detected by means of the detector tube 4 which may supply power to an audio-device such as a telephone or a loud speaker 5. Each of the radio stages is tuned to resonance simultaneously on the same wave-length by the variable condenser 6. An independent section of the condenser 6 is connected to each of the stages, and each movable section of the condenser desirably is secured to a common shaft 7.

The condenser 6 desirably is connected in a grounded electrically conductive container 8 which acts as a shield in the usual manner to prevent outside interference and to minimize interstage coupling. The shaft 7 extends through the shield container and is provided with a gear 9 which meshes with a gear 10 upon a selector shaft 11. Any other suitable connecting means may be utilized to provide a positive drive between the two shafts. The shaft 11 is journalled in a frame 12 which may be secured to the container 8 or to any rigid part of the apparatus. The gear 9 desirably has a pitch diameter twice that of the gear 10, thereby causing the shaft 11 to rotate a complete revolution while the condenser shaft 7 rotates only one-half a revolution. Since most variable condensers are variable throughout one-half a revolution, this gear ratio permits the scope of a complete revolution of the selector shaft during the adjustment of the condenser from its maximum capacity to its minimum capacity.

As will appear more fully hereinafter, the automatic tuning mechanism is to be driven by a non-reversible motor. A reversing device must, therefore, be provided to maintain continuous variation in the capacity of the condenser while the selector shaft rotates continuously in a given direction. A reversing mechanism suitable for obtaining this desirable result will hereinafter be described. If it is found undesirable to install a reversing device, the condenser shaft 7 may be made rotatable for a complete revolution. Under these conditions, a driving ratio of 1 to 1 must be established between the condenser shaft and the selector shaft. Such a drive may comprise a pair of gears 13, shown in Fig. 12. However, when a 1 to 1 drive is employed, the effective scope of the selector shaft, which is an essential part of the selector mechanism, would be reduced to one-half of one revolution.

The condenser shaft 7 is provided with a driving pulley 14 which has a groove therein to receive a driving belt 15. The belt passes over a pair of idler pulleys and thence to another grooved pulley 16 secured upon a shaft 17, which desirably extends through a cabinet 18 within which the complete apparatus is housed. The shaft 17 is rotatably mounted within the cabinet and is provided with a manually operable tuning knob 19 accessibly situated upon the outside of the cabinet. The shaft 7 is also provided with the usual indicator drum 20, or other similar means, upon which suitable indications are imprinted which may represent wave-length divisions or kilocycle divisions, or any arbitrary scale may be employed for observing the adjustment of the condenser. The indications are visible through a window 21 formed in the cabinet. The apparatus may be tuned in the usual way by means of the knob 19 if it is not desired to operate the apparatus automatically. If such is the case, the apparatus may be energized and used in the normal manner. A switch may be provided for disconnecting the electrically operated controlling means during such normal operation.

The condenser 6 desirably is provided with a plurality of stationary plates 22 and a plurality of movable plates 23 interleaving with the plates 22. The movable plates 23 are mounted on the shaft 7. In the form of the condenser shown in Fig. 6, the movable plates 23 are not provided with stops thereby permitting the shaft to rotate throughout a complete revolution. This form of the device permits the use of a 1 to 1 gear ratio between the condenser shaft and the selector shaft, as illustrated in Fig. 12.

The timing of the automatic capacitance controlling means may be determined by any suitable clock mechanism. As shown herein, a small synchronous self-starting motor 24 is provided which when operated from a commercial power line whose frequency is time regulated forms a convenient and accurate timing means. The motor 24 desirably is also employed to actuate the condenser when tuning from one signal to another. In one form of the device, the timing is accomplished by a cam 25, which coacts with a lever 26 to produce a mechanical impulse at predetermined intervals, which impulse acts through a suitable mechanism, to be described hereinafter, to determine the length of time a certain signal shall be received. The cam 25 is mounted on a shaft 27 which is driven from the motor 24 by a suitable train of gears, the last gear 28 of which is secured to the shaft 27. The shaft 29 of the motor is provided with a beveled gear drive 30, which in turn drives a pinion 31 meshing with a train of gears 32, 33 and 34. The gear 34 is arranged to engage or disengage with a gear 35, which acts through a reversing mechanism, to be described hereinafter, to drive the condenser shaft 7.

The gear 34 is mounted in a support 36 pivoted upon a stud shaft 37 fixed in the frame of the motor 24. The shaft 37 serves also rotatively to support the gears 32 and 33. The pivoted support 36 has an extended arm 38 having a slot 39 therein. A pin 40 in the end of a plunger 41 is received in the slot 39. The plunger 41 extends into and is actuated by a solenoid coil 42 fixed upon the frame 12 of the selector mechanism. The coil 42 is provided with terminals 43, which are connected to an electrical circuit, to be described hereinafter. When the coil 42 is energized, the plunger 41 is drawn upward, moving the gear 34 into engagement with the gear 35, causing the condenser shaft to rotate when the coil 42 is de-energized. A spring 44 acts to push the plunger downward, thus disengaging the gears 34 and 35, thereby stopping the rotation of the condenser shaft. As the condenser shaft rotates, the selector shaft 11 also rotates through the action of the gears 9 and 10. Any other suitable mechanism may be employed to establish a proper drive between the motor 24 and the shaft 7.

The shaft 11 has loosely mounted thereon a plurality of index members 45. The members 45 desirably are circular disks having an indexing notch 46 therein. Other means than the notch may be employed for providing the indexing functions of the disks. The disks are preferably mounted adjacent each other along the shaft 11 and have interposed therebetween a plurality of frictional washers 47 which are feathered upon the shaft 11. Each washer has a tongue 48 loosely fitting a slot 49 in the shaft. A collar 50 is fixed upon the shaft at one end of the group of disks, and at the other end a spring 51 engages the disks. The spring is backed by a collar 52 which is adjustable along the shaft to vary the friction between the washers and the disks.

Means are provided to co-operate with the disks and the notches therein to cause proper automatic operation of the mechanism. Such means consists of a pair of sliding carriages 53 and 54. These carriages slide upon a pair of ways 55 and 56 mounted in the frame 12 parallel to the shaft 11. The carriage 54 acts as a detent to prevent certain of the disks from rotating during the preadjusting process, to be described hereinafter. Prior to the preadjusting process, the notches in the disks 45 are in alinement, and the lower edge of the carriage 54 enters the notches. The carriage 53 is provided with an electrical contacting lever 57, pivoted upon the carriage at 58. The vertical arm 59 thereof is in alinement with the inner end 60 of the carriage 53. The lower portion 61 of the carriage 53 and the lower end of the arm 59 of the lever 57 are of the proper dimensions readily to enter the slots 46 in the disks when the slots are presented thereto. The arm 62 of the lever 57 has on the outer end thereof a contact 63, which is adapted to engage a contact screw 64 connected in an insulating block 65 secured to the carriage. The screw 64 is connected to one side of a circuit 66, the other side of which is grounded to the metallic frame of the mechanism. The circuit 66 is connected to a source of current 67, which desirably is the same source employed to energize the whole apparatus. The solenoid 42 is connected in series in the circuit 66.

The carriage 53 is urged towards the right in Fig. 4 by means of a bell crank lever 68, pivoted at 69 upon the frame, the vertical arm of which engages a pin 70 on the carriage 53. The horizontal arm of the lever has a weight 71 on its outer end. Any other suitable means may be employed for moving the carriage 53.

The carriage 54 is movable manually towards the right in Fig. 4 by means of the dial 72 on the outside of the cabinet 18. The dial 72 is secured to the shaft 73, which is journalled in the frame 12 and has secured thereto a pinion gear 74. The gear 74 meshes with a rack 75 secured to the carriage 54. The carriage 54 is urged towards the left by means of a coil spring 76 surrounding the shaft 73, one end of which is anchored to the frame 12 and the other end of which is fixed in the gear 74. During the course of reproduction of a program, the carriage 54 is locked in the position shown in Fig. 4 against the action of the spring 76 by means of a detent projection 77 upon one arm of a bell crank lever 78. The lever 78 is pivoted at 79 on the frame. The other arm of the lever 78 extends downward and has an electrical contact 80 therein, which co-operates with a contact 81 insulated from the frame. In the position shown in Fig. 4, the contact 80 on the lever is completing the circuit 82 leading to the receiving circuits of the apparatus and supplied with current from the source 67.

Upon the completion of a program, the carriage 53 contacts with a lever 83 pivoted on the carriage 54. The lever 83 engages the lever 78, rotating it slightly clockwise which releases the detent 77 and opens the circuit established by the contacts 80 and 81, thus de-energizing the apparatus and causing both of the carriages 53 and 54 to move to the right under the influence of the spring 76. The reason for this motion of the carriages will be more fully described hereinafter.

Each of the disks 45 is arbitrarily assumed to represent a definite period of time. For example, it will be assumed that they represent fifteen minute periods. Since there are twelve of the disks 45 shown, the maximum length of program controlled by the apparatus is three hours. Obviously, there may be a greater or less number of disks and the unit of time chosen may be greater or less than fifteen minutes.

The timing cam 25 has four rises thereon and its shaft turns once every hour. Every fifteen minutes, the lever 26 is actuated by the cam to release the carriage 53 a notch at a time on a ratchet releasing mechanism, to be described. This ratchet releasing mechanism normally withholds the carriage 53 from movement and has, prior to the commencement of the program, been holding the carriage in its extreme left-hand position, shown in Fig. 4. The ratchet releasing mechanism comprises a pair of toothed bars 84 between which a detent 85 fixed upon the lever 26 oscillates as the lever is moved by the cam. When the lever 26 is raised by the cam, the detent releases its engagement with the lower bar 84 and engages with a succeeding tooth on the upper bar. When the lever drops down to a low portion of the cam, the carriage moves another tooth. The teeth are so spaced in the bars 84 that the carriage will move the width of one of the disks 45 throughout the above cycle of movements, and is held against any further movement until the beginning of the next fifteen minute period. Other timing means than that above described may be employed to move the carriage 53.

Another form of timing mechanism is shown in Fig. 10, in which the lower edge of the carriage 53 is toothed, as at 86. An actuating wheel 87 is freely rotatable upon the shaft 11 and is driven by a gear 88 fixed thereto. A pinion 89 meshes with and drives the gear 88. The pinion 89 in turn is driven by a suitable clock mechanism, such as the motor 24, shown in Fig. 4, which is not shown in Fig. 10. The wheel 87 is driven a complete revolution in a fifteen minute period, or whatever the arbitrary period of time may be. At one point on its periphery is situated a projecting cam portion 90 which engages a tooth on the carriage and moves the carriage inward the width of one disk. The cam portion 90 is spirally formed smoothly to engage the teeth, as shown in Fig. 11. The carriage is provided with an electrical contact arm, similar in construction to the lever 57 described in connection with the other form of the device. The construction and operation of the device is otherwise the same as that previously described, with the exception of the bell crank lever 78. Instead of the lever 78, a straight lever 91 is provided, which is pivoted on the frame and has a detent projection 92. The outer end of the lever 91 is provided with a switch contact 93, which acts to de-energize the apparatus at the end of a program. A lever 94, pivoted upon the carriage 54, is engaged by the carriage 53 to release the detent 92, thus causing the carriages to be moved into position for readjustment to another program.

The apparatus as shown in the drawings is adjusted to begin reproduction of a program. When starting the process of adjusting the device to receive a given program, the carriage 53 is in the position shown, but the carriage 54 must then be in its extreme left-hand position engaging the carriage 53, at which time all of the slots 46 in the disks 45 are in alinement and the carriage 54 is holding them against rotation.

To operate the apparatus, it must first be manually adjusted to reproduce a selected program. The procedure of selecting the various features on the program is the same whether they are to be transmitted or received. Assuming that the apparatus is to be used for reception and that the program is to consist of a series of regular broadcast features, the first feature desired is chosen and the manual tuning knob 19 is operated to bring in that particular signal. If that signal is not at the time on the air, the indications on the drum 20 may be observed to obtain the desired adjustment. During this adjustment, a main switch 95 may be closed, thus energizing the apparatus, or if it is desired to locate the various features by means of the indicating drum, the switch 95 may be left in open position. After this initial adjustment, all disks have assumed a definite relative position with relation to the shaft 11 and also with the condenser shaft 7. This position will hereinafter be called the indexing position.

The dial 72 desirably has division marks thereon, the space between each division representing the travel of the carriage 54 an amount equal to the width of one of the disks 45. If it is desired to listen to this initially chosen signal for a fifteen minute period, the dial 72 is moved one division, or if it is desired to listen to this signal for a longer time, as many fifteen minute periods as desired may be chosen and the dial moved a corresponding number of divisions. If we assume a thirty minute period, the carriage 54 will be moved the width of two disks, and during its movement releases the first two disks from engagement with the carriage 54. Any further movement of the shaft 11 will not disturb the relation of these two disks to the shaft 11 since the friction of the washers 47 is sufficient to drive them. The tuning knob 19 is then adjusted to bring in the signal which is subsequently to be listened to and the dial 72 adjusted to select the period of time the second signal is to be heard. This procedure is followed through until the whole period of the program is consumed. Assuming that the program consumes the maximum period of three hours, the elements of the device after adjustment will then have the position shown in the drawings.

If the main switch 95 is not already closed, it is now closed and the apparatus will become energized. The motor 24 will also become energized through the circuit 96 and the terminals 97. The arm 59 of the lever 57 is at this time engaging the first left-hand disk 45 and acting to close contacts 63 and 65 which energize the solenoid 42, which in turn causes the gears 34 and 35 to intermesh and commence to drive the condenser shaft and also the selector shaft. The disks 45 at this time all rotate with the shaft 11. When the slot 46 in the left-hand disk comes into alinement with the arm 59 of the lever 67, the weight of the arm 62 thereof causes the arm 59 to enter the slot and open the contacts 63 and 65 which de-energizes and permits the spring 44 to disengage the gears 34 and 35. The condenser shaft is thereby stopped in the position indexed by the first left-hand disk 45, and the condenser is in the correct adjustment to receive the first number on the program. The timing cam 25 then acts to move the carriage to the right after the lapse of the first fifteen minute period. Since the first two disks are in alinement determined by the preadjusting process, another fifteen minute period elapses during which the same signal is heard. At the end of the thirty minute period, the carriage 53 advances another notch and the arm 59 engages the third disk, which closes the circuit 66 and starts the tuning operation again until the notch in the third disk permits the arm 59 to enter it, at which time the condenser shaft will be indexed in its proper position and the solenoid will again act to disengage the drive between the gears 34 and 35. These operations are automatically repeated until the program is completed, at which time the carriage 53 will have reached its extreme right-hand position engaging the carriage 54 and causing the lever 78 to raise the detent 77, which has been engaging the teeth of the rack 75, to move both carriages to their extreme right-hand positions. Throughout the operation of the apparatus the carriage 53 and the lever 57 constitute the controlling means as they coact with the index members. The spring 76 is sufficiently strong to overcome the action of the weight 71 on the lever 68. Simultaneously with the raising of the detent 77, the contact points 80 and 81 are parted, thus automatically de-energizing the apparatus at the end of the program. Any suitable mechanism may be employed for moving the carriages 53 and 54 into their respective positions during the operation of the apparatus.

Means are provided, as above suggested, for alternately rotating the condenser shaft 7 one-half a revolution in one direction and then reversing the direction of rotation thereof for one-half a revolution, thus bringing it back to its initial position, and then repeating this operation thereby establishing a continuous reciprocating motion of the condenser shaft. A desirable form of such a device is shown in Figs. 5 and 9. The gear 35, which is driven by the gear 34, is rotatively mounted upon a stud shaft 98 fixedly secured in a supporting post 99. The gear 35 meshes with an idler pinion 100, which is relatively long and extends into the plane of and meshes with an internal gear 101. The pinion 100 is rotatably mounted upon a fixed stud secured in an arm 102 projecting from the post 99. The gear 101 is rotatably mounted upon an enlarged hub 103, which is rigidly secured to a supporting post 104. The hub 103 has an aperture 105 therein, through which the end of the condenser shaft 7 projects.

The axes of the gears 35 and 101 are spaced apart the pitch diameter of the pinion 100 and desirably are situated equal distances from the centre of the shaft 7. The two gears 35 and 101 are continuously rotated in opposite directions when the gear 34 meshes with the gear 35. The end of the shaft 7 projects into the space between the gears 35 and 101 and is provided with a laterally projecting actuating arm 106. The gear 101 has fixed therein a pin 107, which at certain times during the operation of the mechanism projects into the path of and acts to drive the arm 106. The gear 35 has therein a pin 108, which also acts to drive the arm 106. As shown in Fig. 5, the gear 101 is moving in the direction of the arrows and the pin 107 is engaging and driving the arm 106 and subsequently rotating the condenser shaft in the same direction as that of the gear 101. As these elements continue to rotate, however, the pin 107 is situated so that when it reaches approximately the level of the axis of the gear it will ride off the end of the arm and cease to drive it. This result is due to the difference in position of the axis of the gear 101 and the axis of the shaft 7. As the pin 107 rides off the end of the arm 106, the pin 108, which is moving in the opposite direction, engages the arm and rotates the shaft 7 one-half a revolution. At the end of this half-revolution, the difference in position between the axis of the gear 35 and the axis of the shaft 7 causes the pin 108 to ride off the end of the arm 106. At this time, the pin 107 will have traveled one-half a revolution and will have assumed the position to engage the arm 106 and acts to drive the arm 107 in the opposite direction, thus restoring it to its initial position. The above series of operations is continually repeated so long as the gear 35 is driven.

Having thus described the invention, what is claimed as new, and desired to be secured by Letters Patent, is:

1. Automatic tuning control for radio communication apparatus comprising a rotatively variable condenser, a selector shaft having a positive driving connection with said condenser, a plurality of index members mounted on and frictionally driven by said selector shaft and adjustable thereon to an indexing position, manually operable means to adjust said condenser to cause the apparatus to resonate at a desired series of wave-lengths, detent means acting to prevent movement of said index members during adjustment of said condenser and means for releasing one or more of said index members by movement of said detent member after such adjustment whereby said index members are adjusted to a series of indexing positions determined by a series of selected wave-lengths, automatic means coacting with said index members to cause them to resonate the apparatus at the desired series of wave-lengths and timing means acting to cause resonance of the apparatus at each wave-length during a predetermined period of time.

2. Automatic tuning control for radio communication apparatus comprising a variable condenser, a plurality of index members each member independently adjustable relative to the adjustment of said condenser, means to adjust said index members into selected relative positions with said condenser determined by the resonance point thereof at a selected wave-length, friction means acting to maintain said index members in their selected relative positions, a constantly rotating motor, driving means operable to engage and disengage said motor and said condenser, controlling means coacting with one at a time of said index members to engage and disengage said driving means to resonate the apparatus at the wave-length determined by the active index member and means to present said controlling means successively to the indexing members at predetermined time intervals.

3. Automatic tuning control for radio communication apparatus comprising a variable condenser, a plurality of index members each member independently adjustable relative to the capacity setting of said condenser, means to adjust said index members into selected relative positions with said condenser determined by the resonance point thereof at selected wave-lengths, a time regulated motor, driving means operable to engage and disengage said motor and said condenser, a bodily movable controlling means coacting with one at a time of said indexing members to cause said driving means to move said condenser into resonance at the wave-length determined by the active index member and timing means driven by the same motor acting to present said controlling means successively to said index members at predetermined time intervals.

FRANCIS T. LEAHY, Jr.